INVENTORS
ROBERT A. JOHNSON
ROGER J. TESKE
BY
*Moody and Phillion*
ATTORNEYS

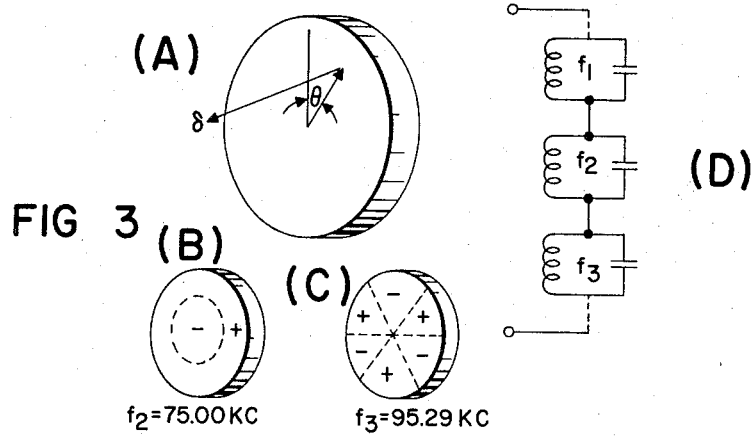
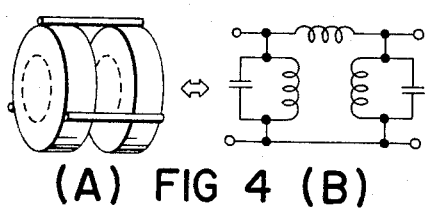
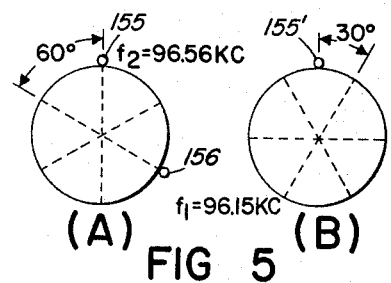
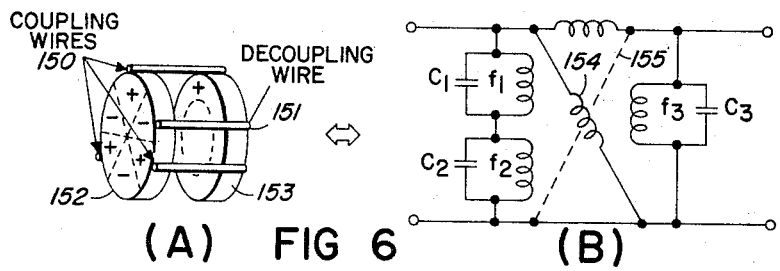
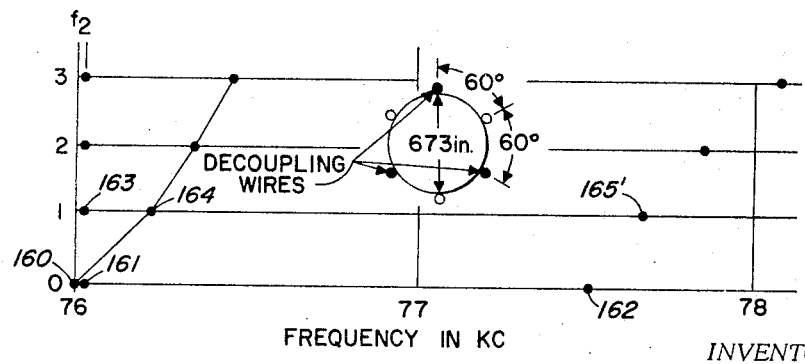
FIG 7
INVENTORS
ROBERT A. JOHNSON
ROGER J. TESKE
BY
*Moody and Phillion*
ATTORNEYS FIG 8
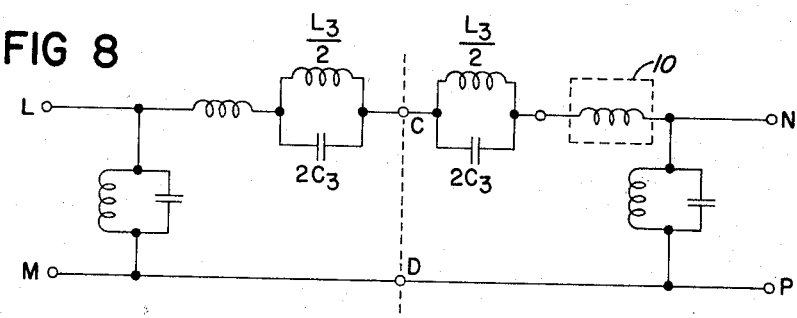
FIG 9
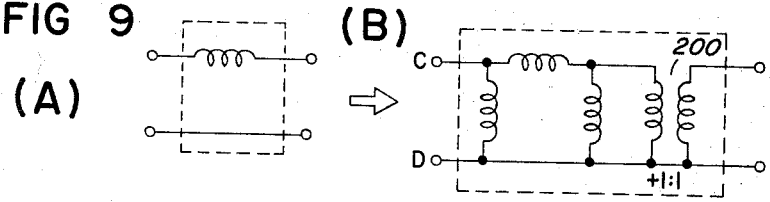
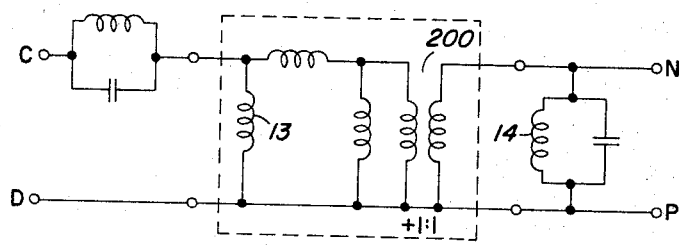
FIG 10
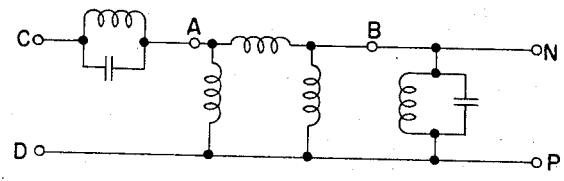
FIG 11
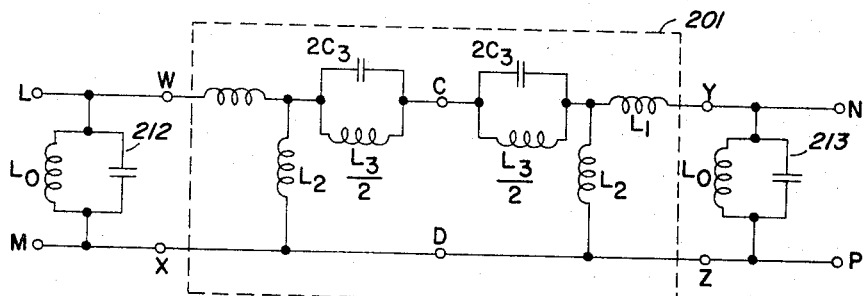
FIG 12
INVENTORS
ROBERT A. JOHNSON
ROGER J. TESKE
BY
Moody and Phillion
ATTORNEYS

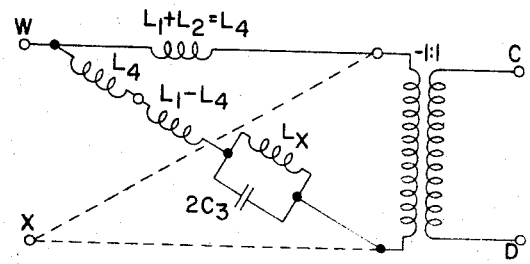
FIG 17
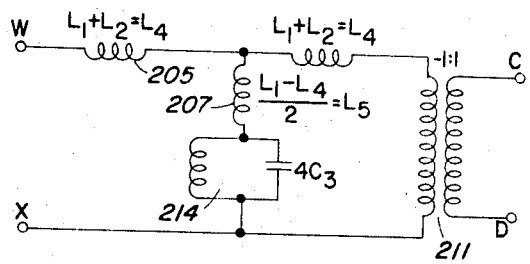
FIG 18
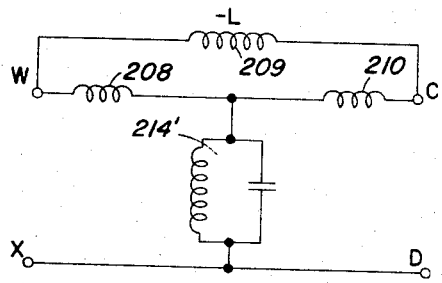
FIG 19
FIG 20
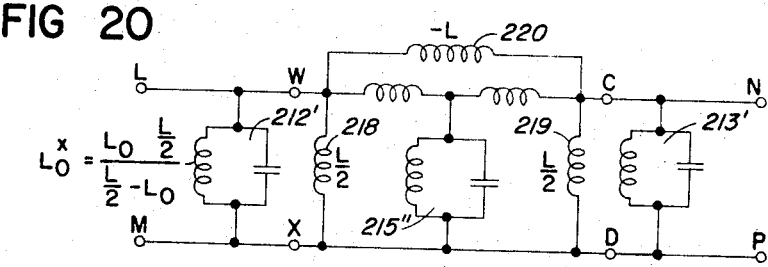

FIG 22
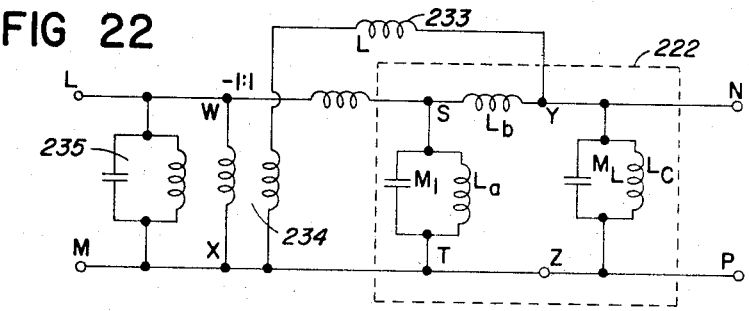
FIG 23
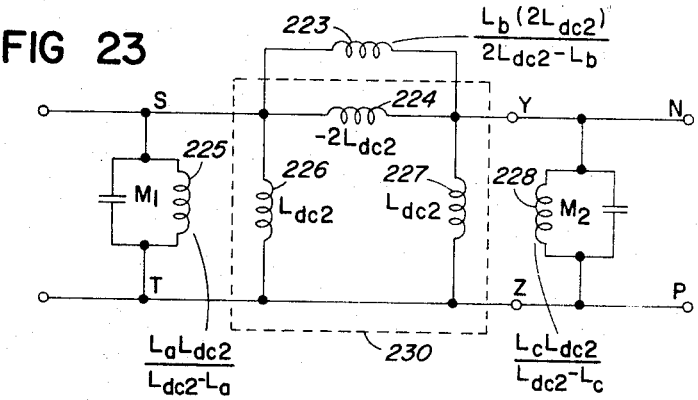
FIG 21 (A)
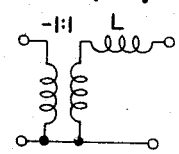
(B)
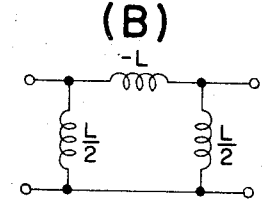
(C)
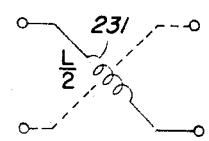
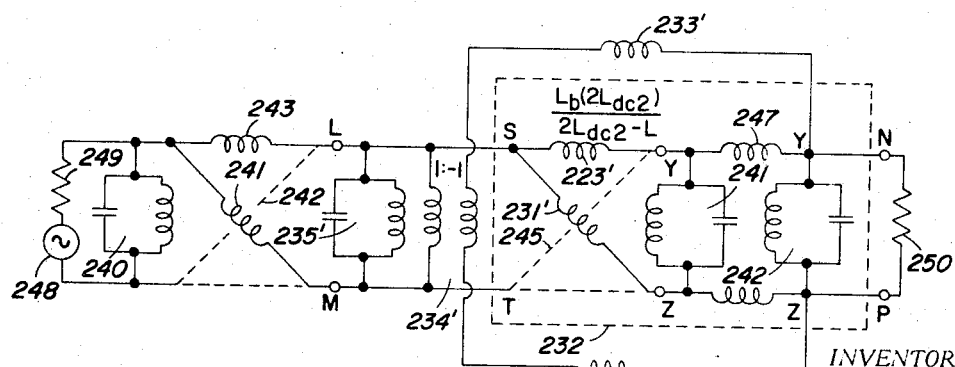
FIG 24

United States Patent Office 3,440,574
Patented Apr. 22, 1969

3,440,574
MECHANICAL FILTER HAVING GENERAL STOPBAND CHARACTERISTICS
Robert A. Johnson, Tustin, and Roger J. Teske, Santa Ana, Calif., assignors to Collins Radio Company, Cedar Rapids, Iowa, a corporation of Iowa
Filed May 5, 1966, Ser. No. 547,947
Int. Cl. H03h 7/12, 7/24
U.S. Cl. 333—72        16 Claims This invention relates generally to mechanical filters and, more particularly, to a mechanical filter which has an attenuation pole on both sides of the passband.

Perhaps the most widely used type mechanical filters currently available consists of a plurality of disks of a magnetostrictive material, which are positioned one on top of the other, but spaced apart a predetermined distance by coupling wires which can be connected to the edges of the disks. At one end of the stack of disks is provided a transducer means which is frequently a ferrite rod with one end fastened to the center of the end disk and with a coil wound thereon. An electrical signal supplied to the coil will cause a mechanical motion in the ferrite driving rod, which motion will be transmitted to the disks. At the other end of the filter another ferrite rod fastened to the end disk with a coil wound thereon is used to translate the mechanical motion back into electrical energy. The disks function as a filter to pass a selected band of mechanical frequencies, which frequency is determined by the specific design of the filter, including the thickness and diameter of the disks, and the diameter of the coupling wires. Such filters provide a rather sharply defined passband and have proven very satisfactory in high quality electronic equipment.

One improvement that has long been sought is a mechanical filter with attenuation poles on both sides of the passband, thus improving the frequency response selectivity of the filter. Most of the currently available mechanical filters, while providing excellent responses, do not exhibit an attenuation pole on both sides of the passband, but rather exhibit a rounded curve at the foot of the leading and trailing edges of the passband.

In a recent development, a means was found to provide an attenuation pole at the upper side of the passband. Basically, such a characteristic was obtained by beveling off a portion of the edge of one of the disks and bridging a coupling wire across the beveled disks to the two adjacent non-beveled disks. By proper selection of thickness or diameters of the disks and coupling wires, it is possible to create a mechanical filter which is the equivalent of an "M" derived electrical type filter, which has an attenuation pole at the upper edge of the passband. A detailed description of the "M" derived type mechanical filter can be found in United States Patent No. 3,135,933 by Robert A. Johnson and entitled " 'M' Derived Mechanical Filter." Such patent is incorporated herein in its entirety by reference.

The primary object of the present invention is to provide a mechanical filter which has an attenuation pole at the lower side of the passband.

A further object of the invention is to provide a mechanical filter which combines the features of the "M" derived filter, with additional structure to provide a resultant mechanical filter structure having attenuation poles both at the upper and the lower edges of the passband.

A third object of the invention is to provide a mechanical filter of the disk-type which has attenuation poles both at the upper edge and the lower edge of the passband, and in which the attenuation poles are individually adjustable in accordance with the designer's needs.

A fourth purpose of the invention is the improvement of mechanical filters, generally.

Before setting forth a general statement of the invention, a brief discussion of the nature of the mechanical motions in disks will be set forth. In most of the currently available mechanical filters employing disks, the type motion is of the oil can type. More specifically, the modes of resonance that are of most interest are circular and are concentric with the perimeter of the disk. In all designs, however, more than one mode can exist. More specifically, each disk also has diameter mode resonances which, for the same disk, occur at both lower and higher frequencies than that of the single circle mode. In a diameter mode the nodes occur along the diameters of the disk. It has been found that in an unloaded disk, i.e., a disk without a coupling wire attached to the perimeter thereof, there is a three diameter mode above and adjacent to the frequency at which a circular mode type resonance occurs. Alternate sections of the disk resonate 180 degrees out-of-phase with the remaining sections.

It is also a characteristic of mechanical filters that at the lower passband each of the circular mode disks resonate in phase with each other. Thus, if a diameter mode disk and two circular mode disks are stacked in that order, the energy transmitted along a conventional coupling wire attached to all three disks, will be in phase at each disk. If, however, a second coupling wire, hereinafter called a bridging wire, is attached from the diameter mode at a point whereat the resonance is 180 degrees out-of-phase from that point to which the conventional coupling wire is attached, and such bridging wire is then bridged over the second disk to the third disk, the energy transmitted through such bridging wire from the diameter mode disk to the third disk is 180 degrees out-of-phase with the energy transmitted along the conventional coupling wire. Thus a transmission "O" will be caused near the lower end of the passband, as will be discussed in considerable detail later in the specification. The transmission "O" or attenuation pole will occur just below the passband at a desired point.

The foregoing general comments form the basic concept of the invention.

In accordance with the invention there is provided a mechanical filter having at least four disks, including a circular mode disk, a diameter mode disk, a second circular mode disk, and a third circular mode disk, arranged in that order. Suitable transducing means are connected to the end disks, i.e., the first and the third circular mode disks, to supply energy into the mechanical resonator at one end and to detect it at the other end. Conventional coupling wires are connected to the perimeters of all four disks elements. The second circular mode disk has a portion of its perimeter beveled flat to permit a bridging wire to extend from the diameter mode disk to the third circular mode disk without touching the second circular mode disk. The relative circumferential positions of the coupling wires and the bridging wire on the diameter mode disk are such that the coupling wires all fall into sectors of resonance having the same phase, whereas the phase inverted bridging wire is attached to a section of the diameter mode disk which resonates at a phase opposite to that to which the conventional coupling wires are connected.

In accordance with another feature of the invention that will be better understood later herein, decoupling wires are connected from the diameter mode disk to adjacent circular mode disks to move the bandpass of the filter arrangement away from an undesirable transmission zero that would otherwise occur somewhere in the lower edge of the bandpass frequency response curve.

In accordance with another feature of the invention, the above-mentioned filter section is combined with an "M" derived filter section, as described in United States Patent No. 3,135,933 to form an overall mechanical filter structure which has transmission zeros both at the lower end and the high end of the passband, with each of the transmission zeros being independently adjustable.

The above-mentioned and other objects and features of the invention will be more fully understood from the following detailed description thereof when read in conjunction with the drawings in which.

Figure 2:
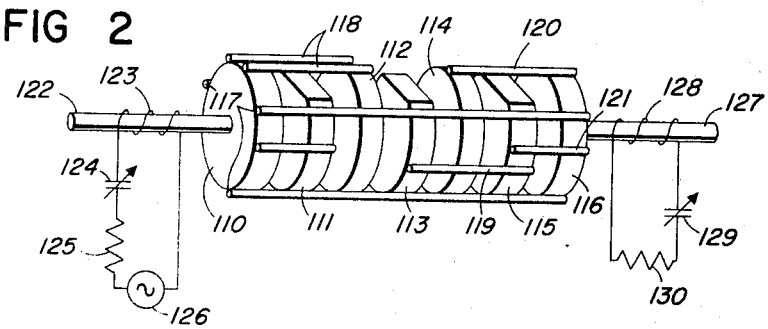
FIG. 2 is a perspective view of a mechanical filter consisting of an "M" derived section and also a section for generating an attenuation pole at the lower side of the passband, which attenuation pole will be sometimes herein referred to as a lower side attenuation pole.
Figure 12A:
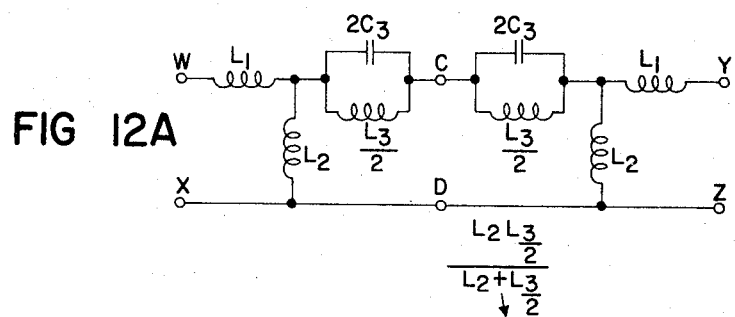
Figure 13:
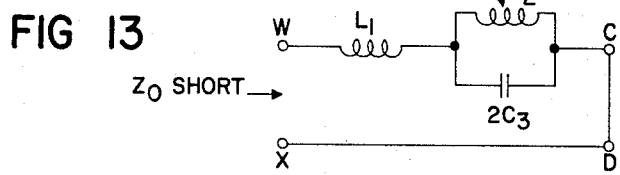
Figure 14:
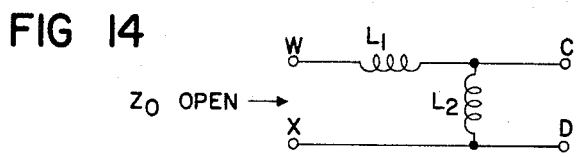
Figure 15:
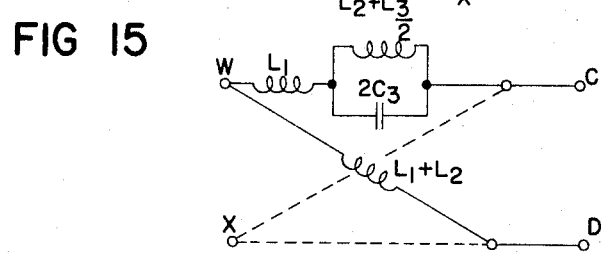
Figure 16:
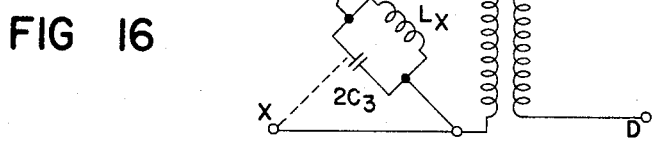
Figure 25:
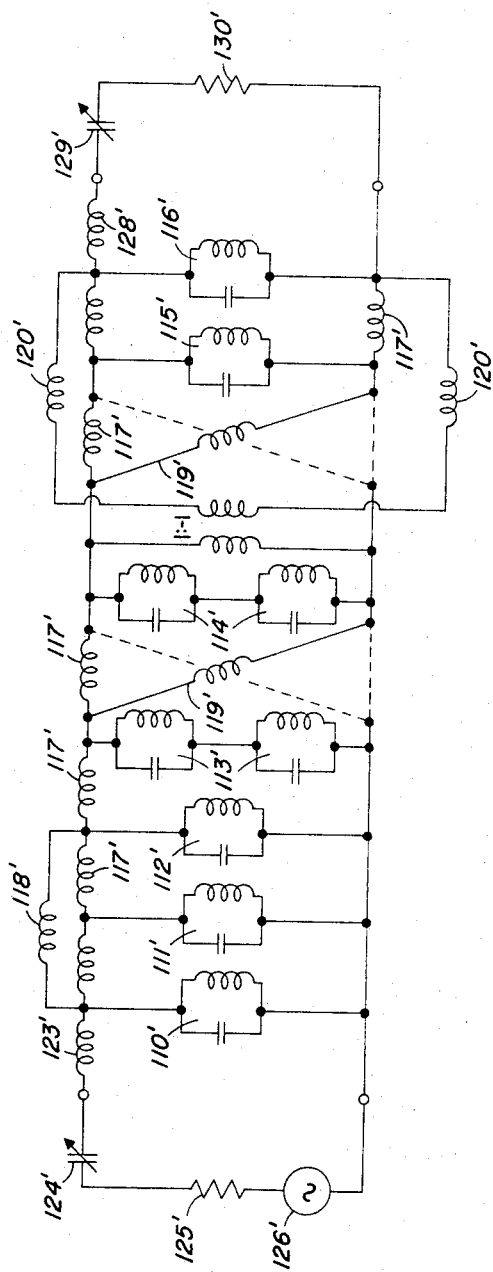
Figure 26:
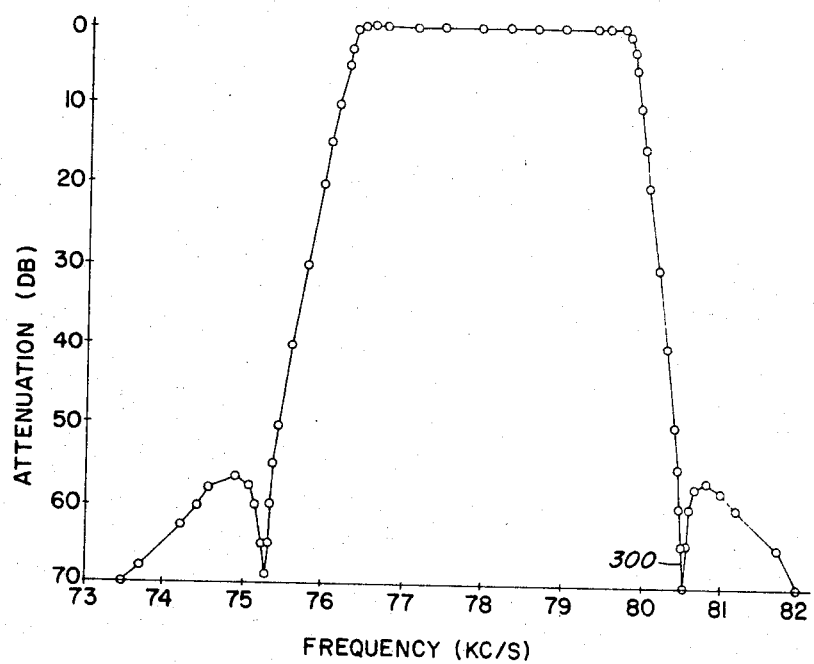

FIGS. 3a, 3b, 3c, and 3d show the circular mode and the diameter mode resonance condition for a disk and also the equivalent circuit therefor;

FIGS. 4a, and 4b show a pair of wire coupled circle mode disks and the electrical circuit analogy therefor;

FIGS. 5a and 5b show two diameter mode resonant conditions for a disk which is edge-loaded with the coupling wire;

FIGS. 6a and 6b show a diameter mode disk and a circle mode disk, wire coupled together, and also shows their electrical analogy;

FIG. 7 is a chart showing the effect of the addition of the coupling wires between a diameter mode disk and the adjacent circle mode disks with respect to a shifting of the frequency passband of the filter;

FIG. 8 is a circuit diagram of an electrical filter having a frequency response curve with an attenuation pole at the lower sideband thereof. From this circuit the electrical circuit which is directly analogous to a mechanical filter section having an attenuation pole at the lower sideband of its frequency response curve will be derived;

FIGS. 9a and 9b show a basic circuit transformation which is employed to transform the circuit of FIG. 8 to that of FIG. 10;

FIG. 10 is the transformed circuit of the right-hand half of FIG. 8 using the transformation of FIGS. 9a and 9b;

FIG. 11 is another form of FIG. 10;

FIG. 12 represents both the left- and right-hand halves of FIG. 8 after the transformations of FIGS. 9 and 10;

FIG. 12a is a portion of FIG. 12 redrawn;

FIGS. 13 and 14 show the short-circuited and open-circuited impedance of a portion of the left-hand half of the circuit of FIG. 12;

FIG. 15 is a lattice-type network utilizing the impedances of FIGS. 13 and 14 to produce a lattice-type circuit, in accordance with Bartlett's Transformation Theorem, from the pi type circuit of FIG. 12;

FIG. 16 is another lattice-type circuit similar to that of FIG. 15, but with the cross arm and the series arm impedances interchanged to effect a phase reversal;

FIGS. 17 and 18 show a transformation which is substantially the reversal of the Bartlett Transformation of FIGS. 13 through 15;

FIG. 19 is another transformation and, more specifically, a wye to delta transformation of a portion of the circuit of FIG. 18;

FIG. 20 is a resultant circuit of the transformations from FIGS. 13 through 19 and is an equivalent circuit of FIG. 12;

FIGS. 21a, 21b, and 21c show some pertinent transformations;

FIG. 22 is a circuit resulting from the transformations of FIGS. 21a, b, and c applied to the circuit of FIG. 20;

FIG. 23 represents a portion of the circuit of FIG. 22 with certain transformations effected therein;

FIG. 24 is the resultant balanced equivalent circuit of a four-disk mechanical filter having an attenuation pole just outside the lower sideband thereof and is obtained by applying the transformations of FIGS. 21a, b, and c to the circuits of FIGS. 22 and 23, as will be discussed in detail in this specification;

FIG. 25 is the overall equivalent circuit of a seven-disk mechanical filter including an "M" derived filter section and a section such as shown in FIG. 24; and FIG. 26 is a frequency response curve of the circuit of FIG. 25 and the structure of FIG. 2.

The general format which this specification will follow is set forth in the outline below:

I. INTRODUCTION—This portion of the specification will discuss the use of bridging wires and mechanical resonators generally.

II. DISK-TYPE RESONANT ELEMENTS—This section will discuss some of the resonant characteristics of disk-type resonant elements, including both the circular mode and the diameter mode of resonance, and their equivalent electrical circuits.

III. COUPLING OF DIAMETER AND CIRCLE MODE RESONATORS—This section will discuss the effects of coupling together pairs of circle mode disks and also a pair of disks consisting of one diameter mode disk and one circular mode disk, and the resultant natural resonant frequencies. Also, the equivalent electrical circuits will be discussed, as well as the effect of coupling and decoupling wires between the diameter mode and circle mode disks.

IV. ELECTRICAL REALIZATION—This section will take a known electrical filter circuit which has the frequency response curve desired, (i.e., with an attenuation pole at the lower side thereof), and by a series of transformations will transform such filter circuit into another electrical filter circuit which is a close equivalent of a mechanical resonator which can be realized by known components such as disks, coupling wires, decoupling wires, and bridging wires.

V. MECHANICAL CONSTRUCTION OF A SEVEN-DISK FILTER—This section discusses some of the more practical design considerations encountered in constructing a filter from the theoretical considerations given in prior portions of the specification.

I. INTRODUCTION

The use of bridging wires in mechanical resonators has made it possible to realize practical mechanical filters having attenuation poles both above (the prior art "M" derived filter) and below the filter passband (the structure of the present invention). Because the resulting reduction in the number of resonators needed, this capability results in filter designs having less differential delay and often less passband ripple than the standard monotonic type mechanical filters; that is, mechanical filters without finite attenuation poles.

Up until the present time, wire coupled disk-type mechanical filters have been designed with attenuation poles existing only at frequencies just above the passband. Through the use or disk resonators vibrating in a diameter mode, as will be discussed in detail in this specification, attenuation poles are herein realized below the passband, thus making it possible to achieve general stopband response characteristics.

Figure 1:
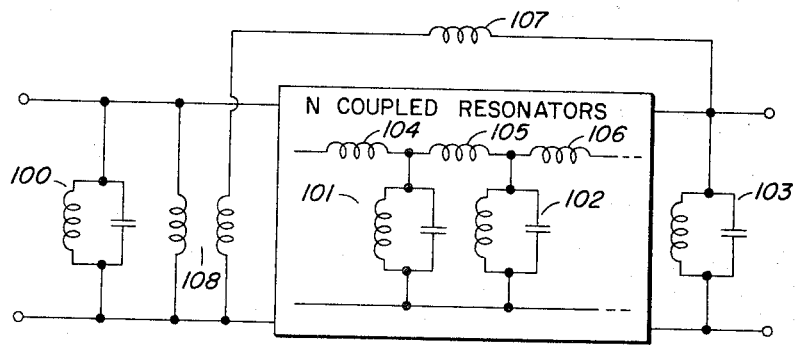
FIG. 1 shows a generalized schematic drawing of an electrical network analogy to mechanical filters using bridging wires.

The general concept of resonator bridging technique can be introduced by referring to the electrical network analogy shown in FIG. 1, which consists of four tuned circuits 100, 101, 102, and 103, each of which represents a resonating disk. The inductors 104, 105, and 106 represent conventional coupling wires connected to each adjacent disk. The inductor 107 represents a bridging wire coupling disk 100 to disk 103 across N resonators which may be the two resonators 101 and 102, or may be simply a single resonator where N is equal to 1. The transformer 108 is meaningless if transformation is a 1 to 1 ratio and is positive. However, if the transformer 108 performs a phase reversal, then a completely different effect is obtained, as will be discussed in detail later. It perhaps should be noted at this point, that with the use of a diameter mode disk as the disk represented by tuned circuit 100, phase reversal can be effected so that transformer 108 would have a −1 to 1 ratio.

Returning again to the general case of FIG. 1, it can be seen that there are four possibilities which are as follows:

(1) Where N is even and transformer 108 is positive.
(2) Where N is odd and transformer 108 is positive.
(3) Where N is even and transformer 108 is negative.
(4) Where N is odd and transformer 108 is negative.

The case where N is odd and the transformer 108 is positive is covered in the aforementioned United States Patent No. 3,135,933 and is identified in the art as an "M" derived filter which produces an attenuation pole at the upper end of the passband.

The first case, where N is even and transformer 108 is positive, produces a mechanical filter having a linear group phase delay over the passband.

The third case, where N is even and transformer 108 is negative, produces a frequency response curve with attenuation poles both at the upper and lower ends of the passband.

In the fourth case, where N is odd and transformer 108 is negative, the mechanical filter has a frequency response curve with an attenuation pole at the lower side thereof and forms the subject of the present invention.

It should be noted that by combining a section as defined in the fourth case with a section as defined in the second case, a mechanical filter having attenuation poles both above and below the passband can be obtained, with the attenuation poles separately adjustable. The aforementioned structure differs from the third case where N is even and the transformer negative, in that the attenuation poles in the third case are not separately adjustable.

Referring now to FIG. 2, there is shown a perspective view of the general stopband mechanical filter, which consists of both an "M" derived section as discussed in United States Patent No. 3,135,933, and a lower side stopband section, which forms the essence of the present invention.

The "M" derived section consists of disks 110, 111, and 112. The lower side stopband section consists of disks 113, 115, and 116, all of which are circle mode disks, and disk 114, which is a diameter mode disk.

Figure 2A:
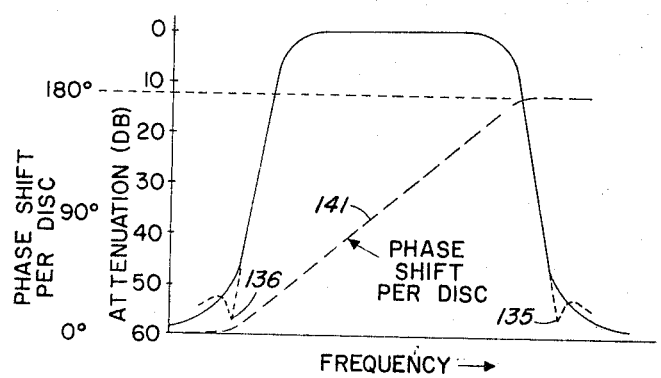
FIG. 2a is a frequency response curve of a mechanical filter with another curve superimposed thereon and showing phase shift between adjacent disks vs. frequency.

The "M" derived section, consisting of disks 110, 111, and 112 functions to generate the attenuation pole above the upper edge of the passband, while the lower side stopband section produces an attenuation pole below the lower end of the passband, as shown in FIG. 2a. In FIG. 2a, the attenuation pole above the upper end of the passband is designated by reference character 135 and the attenuation of the pole below the lower end of the passband is identified by reference character 136.

Referring again to FIG. 2, the general operation is as follows. Electrical energy is supplied from a source 126 through a resistor 125 and then through a tuning capacitor 124 into coil 123. Mechanical motions are thereby induced in ferrite transducer 122, which vibrations are supplied to the first disk 110. The direct coupling wires 117 cause energy to be transferred down through the various disks 111, 112, 113, 114, 115, and 116 and out along ferrite transducer 127. Winding 128 responds to the mechanical vibrations in rod 127 to induce a voltage which is then supplied through capacitor 129 to a load 130.

In the "M" derived portion of the filter the attenuation pole 135 of FIG. 2a is generated primarily by the action of the direct bridging wires 118. In the lower sideband stopband section, the lower attenuation pole 136 is generated primarily by the action of the phase inverting bridging wire 120 which will be described in detail later herein.

The decoupling wire 119 performs the function of removing a spurious attenuation pole near the lower end of the passband. Such spurious attenuation pole is not the attenuation pole 136 of FIG. 2a, but is another attenuation pole near the passband. The precise functioning of the decoupling wire 119 will also be described in detail later herein.

In most mechanical filters an operational characteristic thereof is that near the lower end of the passband there is no phase shift between adjacent disks. In other words, at the lower end of the passband all the disks of the filter are resonating in the same phase. Such relationship is represented generally by the phase shift per disk vs. frequency characteristic curve 141 of FIG. 2a.

However, as the frequency increases through the passband, the phase shift between adjacent disks also increases until it reaches the maximum of approximately 180 degrees phase shift near the upper end of the passband. Such a characteristic of mechanical filters is necessary for the operation of both the "M" derived filter as well as the operation of the lower sideband stopband section.

More specifically, in "M" derived mechanical filters, the direct bridging wires 118 of FIG. 2 will have a phase shift of energy of 180 degrees at the upper end of the passband between disks 110 and 112. However, the direct coupling wires 117 are coupled to the three disks 110, 111, and 112 so that the phase shift is 360 degrees from disk 110 to 112. Thus the energy transferred through direct bridging wire 118 is 180 degrees out of phase with the energy supplied through direct coupling wires 117. Consequently, an energy cancellation takes place to produce the attenuation pole 135 at the upper edge of the passband.

It should be noted that the notch 135 appears just outside the passband rather than at the edge of the passband, where a 180-degree phase shift also exists, for the following reasons.

In the passband the energy transferred through direct coupling wires 117 far exceeds the energy transferred through direct bridging wires 118 because of the greater total cross-sectional area of the direct coupling wires 117. On the other hand, the direct coupling wires 117 are connected to every disk and specifically are attached to each of the three disks 110, 111, and 112 while the bridging wires 118 are connected to only the two disks 110 and 112. Outside the passband, considerable attenuation occurs at each connection between a wire and a disk. More specifically, as the frequency increases above the passband, the attenuation between the disks and the attached coupling wires increases very rapidly and approaches a maximum of about 6 db at each connection between a disk and a wire. Thus the total db loss of the energy transferred through the direct coupling wires 117 across the three disks 110, 111, and 112 would approach 18 db whereas the total db loss of the energy transferred through the bridging wires 118 from disk 110 to 112 would be only about 12 db. Consequently, as the frequency increases above the passband, a point is reached at which the energy passing through the direct bridging wires 118 is equal to that passing through the direct coupling wires 117. It is at this point that the attenuation pole occurs since the two energies are out of phase and cancel each other.

In the lower side stopband section, the attenuation pole is generated in accordance with the same general principle. The phase inverting bridging wire 120 is connected at one end to diameter mode disk 114, and at the other end to circular mode disk 116, bypassing segmented circle mode disk 115. The coupling wires 117 are connected to all three disks 114, 115, and 116. As mentioned before, the diameter mode disks is divided into six pie-shaped sections or segments, with alternate segments vibrating in phases 180 degrees removed from that of the remaining segments. Since the phase inverting bridging wire 120 is connected to a segment which is vibrating 180 degrees out-of-phase with those segments to which the direct coupling wires 117 are connected, the energy supplied from diameter mode disk 114 to end circle mode disk 116 is 180 degrees out-of-phase with the energy supplied through the direct coupling wires. It is important to note that this phenomenon occurs only at the lower end of the passband where there is no phase inversion in the energy passed from disk to disk. As the frequency is lowered below the lower end of the passband, the attenuation through direct coupling wires 117 increases at a greater rate than that through the bridging wire 120, and a point is reached where the energy transferred through the two different coupling means is equal, thus producing the attenuation pole 136.

The above description of the mechanical filter of FIG. 2 is very general and in the following portion of the specification detailed analysis will be given of such structure and constant reference will be made back to FIG. 2 as the description is set forth.

II. DISK-TYPE RESONANT ELEMENTS

A brief discussion of the nature of the vibration of disk-type resonators and their electrical analogies is believed necessary for a thorough understanding of the design and operation of the general stopband type mechanical filter. Although thick disks are used in the actual filter manufactured, thin disk theory is adequate to illustrate most of the amplitude and frequency considerations. The displacement normal to the plane of the disk at a point described by the polar co-ordinates $\theta$ and $r$ of FIG. 3a is:

$$\delta_n = A \cos(n\theta - \alpha)[J_n(kr) + \lambda J_n(ikr)] \cos(\omega t - \epsilon) \quad (1)$$

where $n$ is the number of nodal diameters, $k$ and $\lambda$ are functions of the number of diameters and nodal circles, and $A$, $\alpha$ and $\epsilon$ are amplitude and phase constants.

From the above equation we see that the nodal diameters are equally spaced at angles that satisfy the equation $$\cos(n\theta - \alpha) = 0 \quad (2)$$

whereas the nodal circles satisfy the Bessel equation $$J_n(kr) = \lambda J_n(ikr) = 0 \quad (3)$$

The two cases of the interest in the present general stopband filter design are the single circle ($n=0$) and the three diameter ($n=3$) modes of vibration. The value of $r$ that satisfies Expression 3 for a disk having a unity of radius is 0.68 (which also holds for the thick disk case). Expression 2 is satisfied for the three diameter mode when $\theta$ takes on even and odd multiple values of 60 degrees. As a general example, the single circle and the three diameter bending mode vibration patterns and measured frequencies, of a 0.672 inch diameter, 0.122 inch thick Ni Span-C disk, are shown in FIG. 3b.

The amplitude of the disk vibrations is small in most filter applications. Hence the network is linear as well as bilateral, and both reciprocity and superposition principles are applicable. In addition, by virtue of the fact that the disk has little loss when freely vibrating, the displacements at all points are either in phase or 180 degrees out of phase relative to one another, as shown in FIG. 3b.

In an article entitled "The Vibrations of a System With a Finite or an Infinite Number of Resonances," by E. J. Skudrzyk appearing in volume 30 of the Journal of Acoustical Society of America, December 1958, it has been shown that a mechanical resonator can be treated in much the same way as an electrical one port; with each natural frequency being represented by an associated tuned circuit. In the case of a lossless network, the resonator can be described by one of Foster's Canonical reactance networks containing springs and masses. When driven by a force source, that is, a zero impedance source corresponding to a freely vibrating condition, the natural frequencies of a network are the poles of the driving point mobility (or admittance). Using an analogy where force is analogous to current, the electrical network representation of the disk is shown in FIG. 3d. The natural frequencies of the network of FIG. 3d are the poles of the driving point impedance which correspond to the resonant frequencies of the tuned circuits.

Since the network of FIG. 3d obeys Foster's reactance theorem which is described in the Bell System Technical Journal, vol. 3, 1924, pages 259 to 267, the driving point impedance zeros occur between the poles. When the disk is used as a shunt arm in a ladder network, transmission zeros result from the aforementioned driving point impedance zeros. However, whereas the poles of the driving point impedance are dependent only upon the properties of the disk, such as dimensions, density and stiffness of the disk, the impedance zeros are a function of the driving force distribution, as well. Therefore, as the means of excitation is varied, for example, by changing the position of a coupling wire, the capacity (which is analogous to mass) ratios in the electrical analogy of FIG. 3c are changed, resulting in different driving point impedance zeros.

When designing a mechanical filter it is often possible to ignore the effects, on the passband characteristics, of resonances adjacent the desired mode. When this is the case, a pair of disks coupled by short (less than one-eighth wavelength) small diameter wires can be represented by the network of FIG. 4b. When the disks are tuned to the same frequency, but one vibrates in a single circle mode and the other in a three diameter mode, as shown in FIG. 6a, the equivalent circuit may change considerably, as shown in FIG. 6b. Whether the equivalent circuit of FIG. 4b can be used for the circle diameter mode case depends, specifically, on the means of coupling.

The presence of a decoupling wire 151 in FIG. 6a functions to produce the cross arms 154 and 155 in the lattice circuit of FIG. 6b, thus creating one distinct difference between the equivalent circuit of the structure of FIG. 6a and that of FIG. 4a.

A further distinction between the two circle mode disks of FIG. 4a and the diameter mode-circle mode combination of FIG. 6a is that the mere fact of attaching a coupling wire to the diameter mode disk 152 will produce a second natural frequency, in the diameter mode, for disk 152. Thus the two disks 152 and 153 of the structure of FIG. 6a not only have three natural frequencies when regarded as separate disks, but have three natural system frequencies, as shown in the electrical equivalent circuit of FIG. 6b.

This phenomena, that is the creation of a second natural frequency for the diameter mode disk, creates certain problems relating to an unwanted attenuation pole that will be discussed in the following section.

III. COUPLING OF DIAMETER AND CIRCLE MODE RESONATORS

The magnetostrictive properties of the nickel alloy disk resonators make it possible to measure the natural resonant frequencies of mechanically coupled pairs, as well as individual disks. As discussed above in connection with FIG. 6, a pair of disks comprised of a diameter mode disk and a circle mode disk, exhibit three natural system resonances, whereas two circle mode disks coupled together exhibit only two system resonances. The extra resonance is explained in the following manner. The coupling wire has a small but finite mass. Such a mass attached to the edge of the disk being driven near the frequency of a diameter mode, enables an additional mode of vibration to occur at a nearby frequency. This effect is accompanied by a shift in the position of the nodal diameter lines, as shown in FIGS. 5a and 5b. In FIG. 5a there is shown the three diameter modes which would exist in the absence of coupling wire 155. It should be noted that even with the addition of coupling wire 155, the diameter mode of vibration, as shown in FIG. 5a, will still exist, and at the same frequency $f_2$ as would occur in the absence of the coupling wire 155. However, when the coupling wire 155 is added, an additional diameter mode resonance $f_1$ is created, as shown in FIG. 5b. Such additional resonance $f_1$ has diameter modes which are shifted 30 degrees from the diameter modes of FIG. 5a. Further, it can be seen that $f_1$ differs from $f_2$ by .41 kilocycle. It should be noted that the frequency selected for $f_1$ or $f_2$ are merely typical frequencies. Another disk might have a different pair of frequencies, but they would be close to each other as in the case of FIGS. 5a and 5b.

The presence of coupling wires around the periphery of the disks can obviously effect the behavior of a coupled pair of disks, depending on the modes of vibrations of the disks. An effect always present is that as the diameters of the coupling wires are increased, the spacing between natural system resonances is increased. The system resonances, of course, are not quite the same as the natural resonance of three disks. When both disks are in a circle mode, the main effect of increasing coupling wire diameters is to increase the spacing between the natural system resonances. The placement of the coupling wires at any particular position on the peripheral disk is not critical. Similarly, if one of the disks is a three diameter mode disk and the wires are spaced at 120 degrees, the same effect as in the case of two circle mode disks will be observed, plus the extra resonance described above. However, if one or more wires are now added at spacings other than 120 degrees an important new mechanism is introduced, as shown in FIG. 6a, which mechanism has been discussed briefly in the previous section and which will be discussed in detail below.

The additional wires, identified throughout this specification as decoupling wires, act to decouple. More specifically, the decoupling wires transfer out-of-phase signals from the diameter mode disk 152 to the circle mode disk 153. This effect, as well as the effect of the additional natural resonance due to the added mass of the coupling wires, is represented by the network of FIG. 6b.

Referring now to FIG. 5a, it can be seen that if the coupling wires, such as the wires 155 and 156, are spaced at multiples of 60 degrees the mechanical driving point impedance of the diameter mode disk, at frequency $f_2$ in FIG. 6b, will be very high because of the coincidence of the nodes with the points of contact between coupling wires and disks. Therefore, capacitor $C_2$, which is analogous to mass, is considerably greater than both $C_1$, which corresponds to the mass loaded diameter mode resonance of FIG. 5b, and $C_3$ which corresponds to the resonance of the disk in the circle mode. As discussed earlier, there will be a driving point and a transfer impedance zero between $f_1$ and $f_2$. The frequency of the zero can be shown to be $$f_0 \sqrt{\frac{Mf_2^2 + f_1^2}{M+1}} \qquad (4)$$

where M is=to $C_2/C_1$.

Experimental data showing the shift in the coupled natural frequencies of the disk pair of FIG. 6a as equal sized decoupling wires are added, is shown in FIG. 7. It is to be noted that both the diameter and the circle mode disks were tuned to the same frequency before assembling. In FIG. 7 there is shown the position of the three natural system frequencies for conditions of zero decoupling wires, one decoupling wire, two decoupling wires, and three decoupling wires. For example, where there are no decoupling wires, the three frequencies of the system are designated by points 160, 161, and 162. When one decoupling wire is used, the frequencies are designated by points 163, 164, and 165. When two or three decoupling wires are employed the frequencies move farther apart, as illustrated in the figure.

In the case where there are three natural system frequencies the passband occurs by definition between the two upper frequencies. More specifically, in the case where there are no decoupling wires the passband occurs between the frequencies 161 and 162. However, in accordance with Foster's reactance theorem there is a transmission zero very close to the two frequencies 160 and 161. This transmission zero has been found to actually occur on the slope of the lower skirt and is an undesirable characteristic.

By adding decoupling wires, it has been found that the frequencies 160 and 162 will move upwardly and to the right of FIG. 7 and will correspond to the frequencies 164 and 165 when one decoupling wire is employed. The frequency 161 corresponds to the frequency 163 and does not move to the right in FIG. 7 when a decoupling wire is added, due to the much higher equivalent mass presented by the disk at this resonant frequency. More specifically, the frequencies 161 and 163 correspond to that frequnecy caused by capacitor $C_2$ and the associated inductance in FIG. 6b, and represents the diameter mode resonance which occurs when a diameter node intersects the point of contact of the coupling wire.

Under these conditions, $C_2$ is very large compared with either $C_1$ or $C_3$, or the equivalent mass of either disk 152 or 153 of FIG. 6a at the other two natural frequencies. Consequently, the frequency represented by $C_2$ is very difficult to "pull."

Thus only the two frequencies $f_1$ and $f_3$ of FIG. 6 are moved to the right in FIG. 7 as indicated by frequencies 164 and 165, where one decoupling wire is employed.

However, the undesirable transmission zero which occurred near the two frequencies 160 and 161 will remain at about the same point. It can be seen that the passband existing between frequencies 164 and 165 has been moved away from the undesirable transmission zero. By adding a second and third decoupling wire, the two upper frequencies can be moved away still farther from the transmission zero. However, as can be seen from FIG. 7, the width of the passband increases as the number of decoupling wires is increased from one to two and then to three. The narrowest passband is obtained with one decoupling wire.

It can be seen that decoupling wire 151 of FIG. 6a acts much like the phase inverting bridging wire 120 of FIG. 2 in that both wires transfer out-of-phase energy. However, the bridging wire 120 of FIG. 2 bridges segmented disk 115.

IV. ELECTRICAL REALIZATION

One method of realizing the electrical analogy of the mechanical filter of FIG. 2, is to select an electrical filter circuit, such as the one shown in FIG. 8 which has the desired frequency response characteristics, and then to transform said circuit into a different one having the same topology and relative element values as the desired filter structure.

The filter circuit in FIG. 8 has a frequency response curve with an attenuation pole just outside the lower cut-off frequency, which is the characteristic desired in the mechanical filter of the present invention.

It will be noted that the circuit of FIG. 8 is symmetrical about the center line passing through the points C and D. Considering only the right-hand portion of the circuit and applying Norton's transformations, as shown in FIG. 9, the inductor 10 of FIG. 8 can be transformed into the circuit of FIG. 9b. Making the transformation of FIG. 9b in FIG. 8, the circuit of FIG. 10 is obtained. The transformer portion 200 of FIG. 9b and also of FIG. 10 is a positive 1:1 transformer and, consequently, removable from the circuit, leaving the network shown in FIG. 11.

It is to be understood that the circuit of FIG. 11 represents transformation of only the right-hand half of FIG. 8, as indicated by the terminal markings of C, D, N, and P.

Such terminal markings and other terminal markings are used throughout the series of circuit transformation from FIG. 8 through FIG. 24, with similar letters representing the same terminals from network to network.

Returning again to the circuit transformations, FIG. 12 shows both the right-hand and the left-hand transformations of FIG. 8. The next step is to transform the circuit of FIG. 12 into that of FIG. 20. Generally speaking, such circuit transformation is accomplished by means of Bartlett's Bisection Theorem. To simplify the circuit, that portion within the dotted block 201 if FIG. 12 is redrawn as FIG. 12a.

In applying Bartlett's Bisection Theorem only the left-hand half of FIG. 12a will be employed. FIGS 13 and 14 show the impedance of the left-hand half of FIG. 12a looking into the terminals W and X, when the terminals C and D are short-circuited, and when they are open-circuited, respectively.

Thus the short-circuited impedance looking into terminals W and X is equal to an inductance $L_1$ in series with the parallel circuit $$\frac{L_2 \frac{L_3}{2}}{L_2 + \frac{L_3}{2}}$$

The open-circuited impedance is equal to $L_1 + L_2$. In accordance with Bartlett's Bisection Theorem, the ladder-type network of FIG. 12a can be transformed into the lattice-type network of FIG. 15 with the short-circuited impedance of FIG. 13 forming the series arm impedances thereof and the open-circuited impedance of FIG. 14 forming the cross arm impedances thereof.

Another inherent property of a lattice network is that the series and cross arm impedances can be interchanged, with all parameters in the circuit remaining the same, except that the phase of the output signal is reversed. Thus in FIG. 16 the series arms and cross arms are interchanged and a negative 1:1 transformer 202 added to compensate for the resultant change in phase. Thus the circuit of FIG. 16 is equivalent to the circuit of FIG. 15.

The circuit of FIG. 17 is the same as the circuit of FIG. 16, except that an inductor $L_4$ has been added to the cross arms, and also subtracted therefrom, so that the resultant series inductance in the cross arms is still equal to $L_1$.

By a reverse application of Bartlett's Bisection Theorem, the circuit of FIG. 18 can be substituted for the circuit of 17. This can be proven out by applying Bartlett's Bisection Theorem to the circuit of FIG. 18 and it will be seen that the circuit of FIG. 17 is obtained.

The inductors 205, 206, and 207 of FIG. 18 form a wye network, which by conventional wye to delta transformation theory, can be transformed to the delta circuit of FIG. 19, which delta circuit consists of inductors 208, 209 and 210.

By omitting the negative 1:1 transformer 211 of FIG. 18 the inductor 209 can be defined as a negative inductor.

In FIG. 20 the tank circuits 212' and 213' have been reinserted. Such tank circuits were originally in FIG. 8 and were dropped to simplify the network transformations.

In transforming the circuit of FIG. 20 to that of FIG. 22, certain basic transformations shown in FIGS. 21a, 21b, and 22c must be employed. More specifically, the three circuits of FIGS. 21a, 21b, and 21c are all equivalents of each other. It will be observed that in FIG. 20 the inductors 218, 219, and 220 form a circuit analogous to that of FIG. 21b. Then, by transforming the circuit consisting of inductors 218, 219, and 220 to the form shown in FIG. 21a, the resultant circuit of FIG. 22 is obtained.

In FIG. 20 it is to be noted that inductors 218 and 219 were created from the two inductors $L_0$ of FIG. 12. Thus in FIG. 20 the inductor $L/2$ (218) in parallel with inductor $$L_0^x = \frac{L_0 \frac{L}{2}}{\frac{L}{2} - L_0}$$

is equal to the inductance $L_0$ of FIG. 12.

Referring now to FIG. 22, a further transformation is made of that portion of the circuit within the dotted rectangle 222. More specifically, the circuit within dotted line 222 is shown in FIG. 23 in the transformed condition. The transformations effected are as follows. The inductor $L_b$ is split into two inductors 223 and 224 which, when added together in parallel, will equal $L_b$. Similarly, the inductor $L_a$ of FIG. 22 is split into the two inductors 225 and 226 of FIG. 23, and inductor $L_c$ of FIG. 22 is split into the two inductors 227 and 228 of FIG. 23. The inductors 225 and 226 of FIG. 23 when added together in parallel equal $L_a$. Similarly, the inductors 227 and 228 of FIG. 23 when added together in parallel equal $L_c$.

The circuit within the dotted rectangle 230 is then transformed into the form shown in FIG. 21c. The circuit of FIG. 23 then becomes the circuit within the block 232 of FIG. 24. The inductor 233' of FIG. 24 corresponds to and has a value equal to one-half that of inductance 233 of FIG. 22; the negative 1:1 transformer 234 of FIG. 22 is negative 1:1 transformer 234' of FIG. 24, and the tuned circuit 235 of FIG. 22, which represents the diameter mode disk, becomes the tuned circuit 235' of FIG. 24. The inductor 223 of FIG. 23 becomes the inductor 223' of FIG. 24 and, because of balancing, has twice the value thereof.

Further, in FIG. 24, the tuned circuit 240 represents a circular mode disk coupled to the diameter mode disk, represented by tuned circuit 235', by conventional coupling wire means and also by decoupling wire means. Through the use of transformations similar to those set forth above, the equivalent electrical circuit consisting of inductor 243, representing the conventional coupling wire means, and the lattice structured inductors 241 and 242, representing the decoupling means, can be obtained.

Thus in FIG. 24 there are four tank circuits 240, 235', 241 and 242 which represent, respectively, the disks 113, 114, 115, and 116 of FIG. 2. The lattice structured cross arm inductors 231' and 245 are the equivalent of decoupling wires 119 of FIG. 2. The inductor 233' and the negative 1:1 transformer 234' represent the phase inverted bridging wire 120 of FIG. 2. The inductors 223' and 247 represent the conventional coupling wires 117 of FIG. 2.

At the left of FIG. 24 is an A-C input source 248 and a source resistor 249 which correspond generally to the A-C source 126, resistor 125, tuning capacitor 124, inductor 123, and ferrite transducer 122 of FIG. 2.

Similarly, the output resistor 250 of FIG. 24 corresponds generally to the output structure of FIG. 2, consisting of ferrite transducer 127, coil 128, tuning capacitor 129, and load resistor 130.

Throughout the above circuit transformations, particularly those beginning with FIG. 15 and through FIG. 23, it should be noted that unbalanced networks have been employed. More specifically, in changing the lattice-type network of FIG. 17 into the ladder-type network of FIG. 18, the said ladder-type network of FIG. 18 was made to be an unbalanced circuit.

In the final circuit of FIG. 24 it is desired that the circuit be completely balanced in order to more precisely represent the action of a mechanical filter. However, to employ balanced circuits throughout the circuit transformations of FIG. 17 through 23, would make the analysis unduly complex. Consequently, unbalanced circuits have been employed. If the circuit of FIG. 18 were presented in the balanced form, the impedance looking into terminal X would be the same as that looking into terminal W. Thus, the two inductors $L_4$ would each be split into two equal parts; with two parts being positioned in the present positions of the two inductors $L_4$ and the other two parts having corresponding positions in the X terminal input lead. Similarly, $L_5$ would be split into two equal sections with one of the sections being in the same position as inductor $L_5$ in FIG. 18 and the other section being on the other side of tank circuit 214.

Consequently, the balanced form of the circuit of FIG. 24 is shown in FIG. 25 with inductors 265 and 266, representing phase inverting bridging wires, each representing half the value of inductor 233' of FIG. 24. Similarly, inductors 247 and 267 of FIG. 25, which represent conventional coupling wires, each have a value equal to half that of inductor 247 of FIG. 24.

It should further be noted that throughout the circuit transformations in this section the exact relative values of L and C have not been maintained, since the expressions would then have become quite lengthy and difficult to handle. However, any designer skilled in the art can easily determine the precise values of L and C as each transformation is made.

V. MECHANICAL CONSTRUCTION OF A SEVEN-DISK FILTER

FIG. 25 shows a partially balanced electrical equivalent circuit for the seven-disk filter of FIG. 2. The various electrical circuit components of FIG. 25 are identified by the same reference character, although primed, as the equivalent mechanical part of FIG. 2.

Referring to FIG. 2, the two direct bridging wires 118 were required rather than one, since the use of a single, larger wire presented certain fabrication problems. As discussed hereinbefore, the bridging wires 118 function to produce an attenuation pole on the high frequency side of the passband. Such attenuation pole is identified by reference character 300 in FIG. 26.

It can be seen from FIG. 2 that the second disk 111 has a segment removed therefrom which provides clearance for the bridging wires, as well as modifying the driving point impedance of the disk and the frequencies of natural resonances.

The center disk 113 has an equivalent circuit of the form shown in FIG. 3d. The reason for removing the segment from center disk 113 is as follows. Between the frequencies $f_2$ and $f_3$ of FIGS. 3b and 3c there exists a driving point impedance zero which, for a completely circular disk and the coupling wire orientation of FIG. 2, is between 600 and 800 cycles above the filter passband. Such attenuation pole lies close to the lower edge of the filter passband. However, small variations in coupling wire orientation have a noticeable effect on the equivalent masses of both the single circle and the three diameter mode type disk. Therefore, since the impedance zero is controlled by the mass ratio of the two modes and since such impedance zero results in the attenuation pole, it was decided to remove a segment from the edge of the disk. The removal of the segment changes the equivalent mass ratio, thereby causing the frequency of the attenuation pole to increase from one to two kilocycles. Consequently, at this new attenuation pole frequency, which is further removed from the passband, small variations in the equivalent mass ratio of center disk 113 of FIG. 2 have less effect on the passband and the stopband behavior of the filter.

The attenuation pole below the filter passband is the result of the single bridging wire 120 being driven out of phase by the fifth disk 114. The phase inverted bridging wire 120 couples the diameter mode disk 114 to the end disk 116. The diameter mode disk 114 has a lower equivalent mass than the adjacent circle mode disks so that the need of reducing the coupling between the fourth, fifth, and sixth disks 113, 114, and 115, respectively, is necessary. If the direct coupling wires 117 were not already quite small in diameter, some of this coupling wire could be removed on either side of the diameter mode disk, which would reduce the coupling. This would not be a satisfactory solution, however, because the zero between $f_1$ and $f_2$ of FIG. 5 would be at the lower edge of the passband, the passband frequency being defined approximately as $f_2$.

A solution to the above problem, as discussed above in the specification, is to decouple the three disks 113, 114, and 115 by means of decoupling wires, such as decoupling wire 119, in the sectors of the diameter mode disk next to the 120° spaced direct coupling wires 117. This technique results in the said attenuation pole remaining between $f_1$ and $f_2$ while the highest natural coupled modes move higher in frequency as shown in FIG. 7 for the two disk case. The passband is now defined by the N highest natural resonances; N being the number of mechanical filter disks. If a two-disk filter were built as shown in FIG. 6a, the passband would be defined as being between the two highest natural resonant frequencies in the chart of FIG. 7. In other words, when decoupling is used, the high mechanical impedance diameter mode (where the nodal lines in the coupling wires intersect at the edge of a disk) can be ignored by virtue of the fact that the driving point impedance is so high.

The use of diameter mode disks and bridging wires has made it possible to realize mechanical filters with general stopband characteristics while at the same time retaining a very compact disk wire configuration. Filters have been designed and constructed in the 64 kilocycle to 108 kilocycle frequency region which is widely used in multiplex systems. It is possible to extend the upper limits of this range to 500 kilocycles, although some spurious response might occur due to bending modes in the relatively long bridging wires. However, because of large impedance mismatches, these spurious modes have had little effect on the response characteristics of the cylindrical resonator filters.

It is to be understood that the forms of the invention shown and described herein are but preferred embodiments thereof and that various changes may be made in the relative sizes and numbers of coupling wires and disks without departing from the spirit or scope of the invention.

We claim:
1. A mechanical filter structure comprising:
   a diameter mode disk;
   a first circular mode disk;
   a second circular mode disk positioned between said diameter mode disk and said first circular mode disk and having a segment of the edge thereof removed;
   first coupling wire-like means secured rigidly to the perimeters of said diameter mode disk and said first and second circular mode disks to hold said disks in a fixed position with their axes lying along a common line and spaced apart a distance less than one-half wavelength of the natural resonant frequency of said disks;
   said coupling wire-like means being secured to the perimeter of said diameter mode disk at points all having a first phase of vibration.

2. A mechanical filter structure in accordance with claim 1 and further comprising:
   a third circular mode disk;
   said first wire-like coupling means being secured rigidly to the perimeter of said third circular mode disk to position said third circular mode disk adjacent said diameter mode disk on the side thereof opposite that side on which said second circular mode disk is positioned and with the axis thereof lying along said common line;
   wire-like decoupling means secured rigidly to the perimeters of said second and third circular mode disks and to the perimeter of said diameter mode disk at a point thereon whose phase of vibration is opposite said first phase of vibration.

3. A mechanical filter structure in accordance with claim 2 in which the natural resonant frequency of said diameter mode disk is caused to lie within the desired bandpass frequency of said mechanical filter structure.

4. A mechanical filter structure in accordance with claim 3 and further comprising:
   input transducer means for converting electrical signals into mechanical vibrations and for supplying said mechanical vibrations to a first end disk of the mechanical filter structure;

output transducer means for converting mechanical vibration of the second end disk of the mechanical filter structure into electrical signals;

said input and output transducers each comprising a rod of magnetostrictive material secured to the center of the associated end disk, and a coil wound thereon.

5. A mechanical filter structure comprising:

a first circular mode disk;

a diameter mode disk;

first wire-like coupling means rigidly secured to the perimeters of said circular mode disk and said diameter mode disk to hold said disks in a fixed position with respect to each other, with their axes lying along a common line, and spaced apart a distance less than half the wavelength of the natural resonant frequency of the disks;

said first wire-like coupling means being connected to said diameter mode disk at points all having a first phase of vibration;

and wire-like decoupling means secured rigidly to the perimeters of said circular mode disk and said diameter mode disk with each connection to said diameter mode disk being made at a point whose phase is opposite to said first phase.

6. A mechanical filter structure in accordance with claim 5 and further comprising:

a second circular mode disk;

said first wire-like coupling means being secured rigidly to the perimeter of said second circular mode disk to position said second circular mode disk adjacent said diameter mode disk on the side thereof opposite that side on which said first circular mode disk is positioned and with the axis thereof lying along said common line;

said wire-like decoupling means being rigidly secured to the perimeter of said second circular mode disk.

7. A mechanical filter structure in accordance with claim 6 in which the natural resonant frequency of said diameter mode disk is caused to lie within the desired bandpass frequency of the overall mechanical filter structure.

8. A mechanical filter structure in accordance with claim 7 and further comprising:

input transducer means for converting electrical signals into mechanical vibrations and for supplying said mechanical vibrations to a first end disk of the mechanical filter structure;

output transducer means for converting mechanical vibration of the second end disk of the mechanical filter structure into electrical signals;

said input and output transducers each comprising a rod of magnetostrictive material secured to the center of the associated end disk and a coil wound thereon.

9. A mechanical filter structure having an attenuation pole immediately below its frequency response characteristic and comprising:

a diameter mode disk;

a first circular mode disk;

a second circular mode disk positioned between said diameter mode disk and said first circular mode disk and having a segment of the edge thereof removed;

first wire-like coupling means secured rigidly to the perimeters of said diameter mode disk and said first and second circular mode disks to hold said disks in a fixed stacked relation with each other, with the axes of the disk lying along a common line;

said first wire-like coupling means being connected to said diameter mode disks at points all having the same first phase of vibration;

and wire-like bridging means secured rigidly to the perimeters of said diameter mode disk and said first circular mode disk with each of the connections to said diameter mode disk being made at a point whose phase of vibration is opposite to said first phase, and passing over the segmented portion of said second circular mode disk.

10. A mechanical filter structure in accordance with claim 9 and further comprising:

a third circular mode disk;

said first wire-like coupling means being secured rigidly to the perimeter of said third circular mode disk to position said third circular mode disk adjacent said diameter mode disk on the side thereof opposite that side on which said second circular mode disk is positioned and with the axis thereof lying along said common line;

and wire-like decoupling means secured rigidly to the perimeters of said second and third circular mode disk and to the perimeter of said diameter mode disk at a point thereon whose phase of vibration is opposite to said first phase.

11. A mechanical filter structure in accordance with claim 10 in which the natural resonant frequency of said diameter mode disk is caused to lie within the desired bandpass frequency of said mechanical filter structure.

12. A mechanical filter structure in accordance with claim 11 and further comprising:

input transducer means for converting electrical signals into mechanical vibrations and for supplying said mechanical vibrations to a first end disk of the mechanical filter structure;

output transducer means for converting mechanical vibration of the second end disk of the mechanical filter structure into electrical signals;

said input and output transducers each comprising a rod of magnetostrictive material secured to the center of the associated end disk and a coil wound thereon.

13. In a mechanical filter comprising an "M" derived type first mechanical filter section including:

a first plurality of circular mode disks;

and first wire-like coupling means rigidly secured to the perimeters of said disks to hold said disks in fixed positions with their axis lying along a common line;

a second mechanical filter section comprising:

a diameter mode disk;

a first circular mode disk;

a second circular mode disk positioned between said diameter mode disk and said first circular mode disk and having a segment of the edge thereof removed;

said first wire-like coupling means secured rigidly to the perimeters of said diameter mode disk, said first circular mode disk and said second circular mode disk to hold said disks in a fixed position with their axes lying along said common line;

said first wire-like coupling means being connected to said diameter mode disks at points all having the same first phase of vibration;

and wire-like bridging means secured rigidly to the perimeters of said diameter mode disk and said first circular mode disk with each of the connections to said diameter mode disk being made at a point whose phase of vibration is opposite said first phase, and passing over the segmented portion of said second circular mode disk.

14. A mechanical filter structure in accordance with claim 13 and further comprising:

a third circular mode disk;

said first wire-like coupling means being secured rigidly to the perimeter of said circular mode disk to position said third circular mode disk adjacent said diameter mode disk on the side thereof opposite that side on which said second circular mode disk is positioned and with the axis thereof lying along said common line;

wire-like decoupling means secured rigidly to the perimeters of said second and third circular mode disks and to the perimeter of said diameter mode disk at a point thereon whose phase of vibration is opposite to said first phase.

15. A mechanical filter structure in accordance with claim 14 in which the natural resonant frequency of said diameter mode disk is caused to lie within the desired bandpass frequency of said mechanical filter structure.

16. A mechanical filter structure in accordance with claim 15 and further comprising:
input transducer means for converting electrical signals into mechanical vibrations and for supplying said mechanical vibrations to a first end disk of the mechanical filter structure;
output transducer means for converting mechanical vibration of the second end disk of the mechanical filter structure into electrical signals;
said input and output transducers each comprising a rod of magnetostrictive material secured to the center of the associated end disk, and a coil wound thereon.

References Cited
UNITED STATES PATENTS 2,906,972    9/1959    Leonard et al. _____ 333—71
3,135,933    6/1964    Johnson _____ 333—72 X JOHN KOMINSKI, *Primary Examiner.*

L. J. DAHL, *Assistant Examiner.*

U.S. Cl. X.R.

333—71